United States Patent [19]
Okamura

[11] Patent Number: 6,014,285
[45] Date of Patent: Jan. 11, 2000

[54] POSITIONING CONTROL SYSTEM

[75] Inventor: Eiji Okamura, Kawasaki, Japan

[73] Assignee: Fujitsu Limited, Kawasaki, Japan

[21] Appl. No.: 08/011,682

[22] Filed: Feb. 1, 1993

[30] Foreign Application Priority Data

Jan. 31, 1992 [JP] Japan .................................. 4-016774

[51] Int. Cl.[7] .............................................. G11B 5/596
[52] U.S. Cl. .................................... 360/78.04; 369/44.29
[58] Field of Search ........................... 360/78.09, 78.04, 360/77.04, 78.05, 61; 318/611; 369/44.28, 44.29

[56] References Cited

U.S. PATENT DOCUMENTS

| | | | |
|---|---|---|---|
| 4,697,127 | 9/1987 | Stich et al. | 318/561 |
| 4,949,201 | 8/1990 | Abed | 360/77.04 X |
| 4,980,625 | 12/1990 | Shimada | 318/568.1 |
| 5,168,398 | 12/1992 | Kanda et al. | 360/77.04 X |

OTHER PUBLICATIONS

Lathi, "Modern Digital and Analog Communication Systems" 2nd ed. 1989, pp. 81–82.

"Digital Control of Dynamic Systems", G.F. Franklin, et al., Addison–Wesley Publishing Company, 2nd Edition, 1990, pp. 703–751.

I.D. Mitchell, Jr., "A Simulation of a Digital Adaptive Notch Filter", Proceedings of the Sixteenth Southeastern Symposium on System Theory, Mar. 25–27, 1984, Silver Spring, MD, USA, pp. 165–168.

*Primary Examiner*—Andrew L. Sniezek
*Attorney, Agent, or Firm*—Greer, Burns & Crain, Ltd.

[57] ABSTRACT

A positioning control system is provided with a controlled device which has resonance characteristic and is positioned at a designated position; position detector for detecting a moved position of the controlled device in accordance with a servo signal or the like; arithmetic controller such as a DSP (Digital Signal Processor) adapted to generate a drive signal based on a position detection signal from the position detector and the designated position; and a drive adapted to move the controlled device in accordance with the drive signal from the arithmetic controller. The arithmetic controller includes a low pass filter which has an abrupt slope and a discontinuous pole in the gain-frequency characteristics thereof to suppress the resonance characteristics.

Preferably, the low pass filter is constituted by a combination of a notch filter and an elliptical function filter.

11 Claims, 16 Drawing Sheets

POSITIONING CONTROL SYSTEM

BACKGROUND OF THE INVENTION

1. Field of the Invention

The present invention relates to a positioning control system for positioning at least one magnetic head or similar controlled device at a designated position at high speed.

There is recently a tendency to demand, in a computer system, a transfer of large amounts of data at high speed, and therefore, an auxiliary storage device such as a magnetic disk drive or optical disk drive is also required to transfer large amounts of data at high speed to exchange data with a host device.

To meet this requirement, it is essential that a controlled device such as a magnetic head, an optical head, a print head, or the like should be positioned at a designated position at high speed and with high accuracy. Since the controlled device is driven at a high velocity and high acceleration when such a head positioning (head seek operation) is executed at high speed, the mechanical resonance phenomenon, which forces the controlled device to vibrate even after the head positioning is completed, is likely to occur. Thus, there is a demand to provide a stable control by suppressing the mechanical resonance characteristics represented by the vibration of controlled device.

2. Description of the Related Art

In general, in a magnetic disk drive or the like, data transfer speed is limited by a rotation speed of a motor which rotates a magnetic disk or the like as a recording medium. Accordingly, if it is intended to attain a substantially higher data transfer speed with the current rotation speed, first of all, it is necessary that a larger number of recording media such as magnetic disks, each having a higher density recording surface (e.g., a track pitch thereof being less than 10 $\mu$m), should be contained in a magnetic disk drive or the like to increase data recording density and data storage capacity. Next, it is necessary that a plurality of controlled devices such as magnetic heads should be provided, corresponding to the respective recording media, so as to write and read data in parallel to or from the magnetic disks by moving the plurality of magnetic heads simultaneously and at high speed with one actuator.

In other words, a number of magnetic heads are mounted on one actuator via a plurality of head arms, and therefore a plurality of mechanical resonance frequencies are generated due to the respective magnetic heads and head arms. Furthermore, since the magnetic heads must be moved at high speed, it is necessary for the respective head arms to be as light in weight as possible. Therefore, various mechanical resonance modes are likely to occur, which results in the complexity of the control of mechanical resonance characteristics.

Hereinafter, to facilitate an understanding of the mechanical resonances of controlled devices, the construction of magnetic disk drives including magnetic heads will be described representatively with reference to the drawings.

FIGS. 1(A) and 1(B) are diagrams showing a magnetic disk drive. To be more specific, FIG. 1(A) is a schematic plan view of the magnetic disk drive, and FIG. 1(B) is a schematic side view thereof. The reference numeral 50 denotes a plurality of magnetic disks, 51 a rotatable shaft, 52 an actuator, 53 arms, 54 gimbals, 55 core sliders including magnetic heads, and 56 a rotatable shaft. The rotatable shaft 51 having the magnetic disks 50 fixed thereon is rotated by an motor (not shown). In the illustrated example, ten magnetic disks 50 are fixed on the rotatable shaft 51. However, it may be also possible to a different number of magnetic disks 50 on the rotatable shaft 51 according to the required storage capacity and data transfer speed.

Further, in this example, the core slider 55 is supported on each arm 53 through two gimbals 54. The core sliders 55 move radially across the magnetic disks 50 by rotating the arms 53 about the rotatable shaft 56 of the actuator 52, and thereby each of the magnetic heads is positioned at the designated position (track). Through the magnetic heads, data are written on the magnetic disks 50 or data stored on the magnetic disks 50 are read therefrom.

As the recording density (track density) of the magnetic disks 50 increases, it is necessary to drive the actuator 52 at high speed, and to move and position the respective magnetic heads to the designated tracks at high speed and with high accuracy. In this case, the arms 53 including the core sliders 55 are driven at a high velocity and high acceleration by the actuator 52, and accordingly the mechanical resonance, which results in the vibration of the magnetic heads, becomes a problem. Thus, it is required to suppress the mechanical resonance characteristic or to transfer the resonance frequency to a higher frequency band so as to eliminate the influence on a control frequency band of the magnetic heads.

FIG. 2 is a graph showing the exemplary transfer characteristics (x/i characteristics; a response x in a head position relative to a current i supplied to a voice coil motor constituting the actuator) of the actuator. In FIG. 2, the response x is typically represented by a frequency response of a gain and phase of a head positioning control system. To be more specific, a horizontal axis represents frequency (Hz), the left vertical axis represents gain (dB), and the right vertical axis represents phase (deg). The curve (a) represents the gain characteristics, while the curve (b) represents the phase characteristics. As apparent from these transfer characteristics, there are several mechanical resonances where the gains remarkably increase, resulting from the structure of the actuator, the magnetic heads, etc. The typical resonances include a main resonance and a torsional resonance of the whole actuator, a resonance of vertical direction and a torsional resonance of the fork-shaped arms having a number of heads mounted thereon, a resonance of spring arms between the heads and the actuator, and a resonance of the voice coil motor.

The aforementioned resonance characteristics are not uniform in terms of the resonance frequency and the resonance strength of each of the storage devices, and vary depending on the storage devices. Further, even in a specific device, the resonance characteristics vary according to the temperature change, aging, and rotational position of each of the arms (head positions). In the case of controlling this type of actuator, a transfer function of the actuator F(s) and a transfer function Freso(s) representing the mechanical resonance characteristics are expressed as follows.

$$F(s) = \frac{Km}{s^2} \times Freso(s) \quad (1)$$

$$Freso(s) = \sum_{i=1}^{n} \frac{a_i s + b_i}{s^2 + 2\zeta_i \omega_i s + \omega_i^2} \quad (2)$$

$$Km = \frac{K_T R_H}{J} [m/(A - S^2)] \quad (3)$$

If this actuator is modeled on the assumption that it is a rigid body, it can be assumed that Freso(s)=1. Further, Km in the equation (3) is expressed assuming that a moment of inertia of the rotary type actuator is J (kg·m$^2$), a torque constant of the voice coil motor is $K_T$ (N–m/A), and the distance between the center of rotation and the head is $R_H$ (m).

The control system for the conventional actuator having the above resonance characteristic is shown in FIG. 3. In this figure, the reference numeral 61 denotes an adder (also represented by Σ), 62 a loop compensator, 63 a notch filter group that will be described in relation to FIGS. 4 and 5, 64 a power amplifier, and 65 a controlled device (plant) including the actuator and the magnetic head. The position information of the controlled device 65 and the designated position information are given to the adder 61, and the controlled device 65 is controlled through the loop compensator 62, the notch filter group 63, and the power amplifier 64, so that the difference between the position information and the designated position information becomes a specified value such as zero.

The loop compensator 62 in this control system includes a combination of a lead lag filter adjusting a phase angle of the system for stabilizing the loop and a secondary filter for reducing noise in a high frequency band. The transfer function Gc(s) thereof representing a ratio of output signal to input signal is expressed as follows, in equation (4).

$$Gc(s) = Gco \frac{s + \omega_{Ld}}{s + \omega_{Lg}} \frac{1}{s^2 + 2\zeta_c \omega_c s + \omega_c^2} \quad (4)$$

where Gco is a direct current gain, $\omega_{Ld}$ is a lead compensating angular frequency (an angular frequency corresponds to a phase angle), $\omega_{Lg}$ is a lag compensating angular frequency, $\zeta_c$ and $\omega_c$ are a damping ratio and a cut-off angular frequency of the secondary filter, respectively.

Generally, the loop compensator has an integrator {transfer function=[(s+$\omega_i$)/s]} connected in series so as to eliminate a steady position error. However, in this example, the integrator is not illustrated for the sake of simplification. In the case where the controlled device 65 has no or negligible mechanical resonance characteristics, the control can be executed stably by providing the loop compensator 62 as shown in FIG. 3.

Further, it is also possible to use a state feedback regulator using the loop compensator 62 as an observer. A state equation and an output equation in this case are as expressed in the following equations (5) and (6). Based on these equations (5) and (6), an observer equation expressed in equation (7) is obtained.

$$\frac{d}{dt}\begin{bmatrix} x \\ y \end{bmatrix} = \begin{bmatrix} 0 & 1 \\ 0 & 0 \end{bmatrix}\begin{bmatrix} x \\ v \end{bmatrix} + \begin{bmatrix} 0 \\ Km \end{bmatrix}u \quad (5)$$

$$y = \begin{bmatrix} 1 & 0 \end{bmatrix}\begin{bmatrix} x \\ v \end{bmatrix} \quad (6)$$

$$\frac{d}{dt}\begin{bmatrix} Estx \\ Estv \end{bmatrix} = \begin{bmatrix} 0 & 1 \\ 0 & 0 \end{bmatrix}\begin{bmatrix} Estx \\ Estv \end{bmatrix} + \begin{bmatrix} 0 \\ Km \end{bmatrix}u + \begin{bmatrix} L1 \\ L2 \end{bmatrix}(x - Estx) \quad (7)$$

$$u = k_1 \times Estx - k_2 \times Estv \quad (8)$$

If L1, L2 in the equation (7) are selected with reference to a related reference (G. F. Franklin, J. D. Powell and M. L. Workman "Digital Control of Dynamic Systems", Second Edition, Addison-Wesley, 1990), Estx and Estv are selected so that they become estimated values of the position x and the speed v, respectively. Accordingly, the controlled device can be controlled by selecting the gains $k_1$, $k_2$ in accordance with a controller equation expressed by the equation (8) using the state feedback.

However, in the case where the mechanical resonance characteristics are not negligible, a required number m of notch filters are connected in series with the loop compensator 62 in order to cancel a resonance energy caused by the large mechanical resonance characteristics, as shown in the following equation (9). In other words, the notch filter group 63 constituted by the plurality of notch filters is provided.

$$Gn(s) = \prod_{j=1}^{m} \frac{s^2 + 2\zeta_{nj}\omega_{nj}d_{nj}s + \omega_{nj}^2}{s^2 + 2\zeta_{nj}\omega_{nj}s + \omega_{nj}^2} \quad (9)$$

where $\zeta_{nj}$ denotes a damping ratio of the notch filters, $\omega_{nj}$ denotes a notch center angular frequency in the center of each notch portion, and $d_{nj}$ denotes the depth of each notch portion. Here, it is assumed that $d_{nj} < 1$.

Further, to enable the function of the notch filter group in FIG. 3 to be understood more clearly, exemplary transfer characteristics of a single notch filter and notch filter group are illustrated in FIG. 4 and FIG. 5, respectively.

As apparent from FIG. 4, frequency characteristics of the gain of the notch filter have a notch-shaped form, where only the gain corresponding to an extremely narrow frequency range in the closest vicinity of a notch center frequency $f_0$ is remarkably low. Through the notch filter, the input signal having the frequency $f_0$ is eliminated and therefore substantially not transferred.

By virtue of such characteristics of the notch filter, the mechanical resonance energy generated in the resonance frequency $f_0$ can be eliminated. Accordingly, if a plurality of notch filters are designed in conformity with the respectively corresponding resonance frequencies shown in FIGS. 2 and 5 (in FIG. 5, six resonance frequencies $f_0$–$f_5$ are illustrated representatively), and if the notch filter group is constituted by connecting these notch filters in cascade, many mechanical resonances can be eliminated simultaneously.

In such a construction, the notch filters are each constructed so that the notch center angular frequency $\omega_{nj}$ coincides with the respective mechanical frequencies in the mechanical resonance characteristics. However, if the resonance frequency and the resonance strength differ depending upon the storage devices such as magnetic disk drives, it is required to design the notch filter according to the resonance frequency and the resonance strength of each storage device. Further, even in a specific device, due to the temperature change and the aging, the resonance frequency is shifted from the notch center frequency, thereby resulting in the disadvantage that the resonance characteristics cannot be suppressed effectively. If there are more mechanical resonance points of the controlled device 65, this results in a large construction of the notch filter group 63 including the notch filters corresponding to the respective resonance points (frequencies). When the notch filters are constituted by analog circuits, the number of parts is increased thereby making the notch filter group larger in size and more costly. On the other hand, when the notch filters are constituted by digital circuits, a disadvantage occurs in that provision of an expensive high speed operating DSP (digital signal processor) is necessitated, in order to process various signals at high speed so that a filter calculation time does not become longer.

Especially, in regard to the magnetic disk drive, there is a recent requirement for transferring large amounts of data at high speed as described before.

To address this requirement, the track density of each magnetic disk is designed to be as high as possible, and the number of magnetic disks contained in one magnetic disk drive is intended to be as large as possible. Further, as the number of magnetic disks increases, the number of the corresponding magnetic heads and head arms is likely to increase. Therefore, a larger number of head and head arms are fixed to one actuator, which leads to complexity of the structure of actuator. Further, since the actuator, the arms, etc., must be moved at high speed to ensure the data transfer at high speed, they are required to be fabricated, utilizing a light metal such as aluminum. Accordingly, the mechanical resonance modes and the resonance frequencies are likely to increase. Due to various resonance energies caused by such resonance modes, residual vibrations of the magnetic heads after a seek operation is completed are likely to occur over a wider frequency range.

Consequently, it becomes difficult for all these resonant energies to be canceled by only the notch filter group, in the magnetic disk drive.

SUMMARY OF THE INVENTION

To handle these problems, the main object of the present invention is to provide a positioning control system which enables at least one controlled device to be positioned at a designated position at high speed and with high accuracy.

A further object of the present invention is to provide a positioning control system which enables a stable control by eliminating the influence of the mechanical resonance of a controlled device with a relatively simple construction.

A still further object of the present invention is to provide a positioning control system which can assuredly suppress a plurality of mechanical resonances, especially those occurring in magnetic disk drive having many magnetic heads, without using a complicated filter construction such as a notch filter group.

A still further object of the present invention is to provide a positioning control system which can rapidly suppress the residual vibration of each magnetic head occurring due to the magnetic resonances, after a seek operation thereof is completed.

To attain these objects, the positioning control system according to the present invention comprises a controlled device having resonance characteristics and positioned at a designated position; position detecting means for detecting a moved position of the controlled device; arithmetic control means for generating a drive signal based on a position detection signal from the position detecting means and based on the designated position; and drive means for moving the controlled device in accordance with the drive signal from the arithmetic control means. Further, the arithmetic control means includes a low pass filter which has an abrupt slope and a discontinuous pole in the gain-frequency characteristics thereof, so that the resonance characteristics of the controlled device can be suppressed.

Preferably, the arithmetic control means is constituted by a combination of a notch filter and an elliptical function filter so that all the resonance frequencies occurring in the resonance characteristics can be filtered out.

Further, preferably, the lowest resonance frequency can be suppressed by means of the notch filter, and the second lowest or the higher resonance frequency can be eliminated altogether by mean of the elliptical function filter.

Further, preferably, the low pass filter is constructed so as to be turned off, for instance, during a seek operation of a controlled device and so as to be turned on, for instance, during a following operation of the controlled device.

Further, preferably, the positioning control system according to the present invention can be applied to head positioning of a magnetic disk drive, optical disk drive, a printer or the like.

Especially in the magnetic disk drive, the controlled device includes at least one magnetic head which is movable on at least one magnetic disk and an actuator for positioning the magnetic head at a designated track position.

In the present invention, the resonance characteristics, which result in the vibration of the controlled device, can be suppressed stably by a simple low pass filter construction typically utilizing the combination of a notch filter and an elliptical function filter.

BRIEF DESCRIPTION OF THE DRAWINGS

The above objects and features of the present invention will be more apparent from the following description of the preferred embodiments with reference to the accompanying drawings, wherein.

DESCRIPTION OF THE PREFERRED EMBODIMENTS

Figure 6:
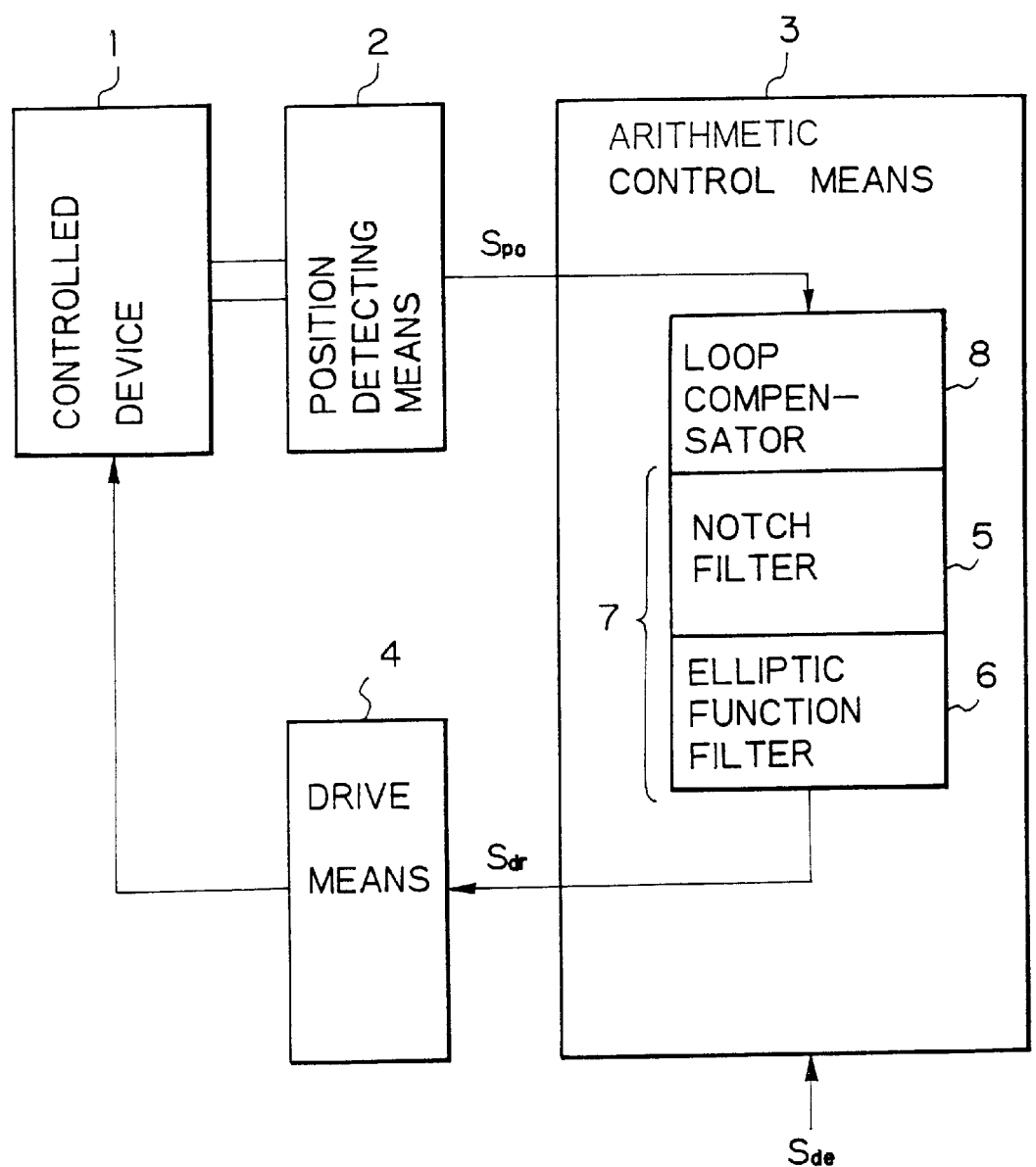
FIG. 6 is a block diagram showing an essential embodiment based on the principle of the present invention.

FIG. 6 is a block diagram showing an essential embodiment based on the principle of the present invention.

In FIG. 6, the positioning control system comprises a controlled device 1 having a resonance characteristics and is positioned at a designated position; position detecting means 2 for detecting a moved position of the controlled device 1; arithmetic control means 3 for generating a drive signal $S_{dr}$ based on a position detection signal $S_{po}$ from the position detecting means 2 and based on a designated position address (code) $S_{de}$ input to the arithmetic control means 3 from a host device; and drive means 4 for moving the controlled device 1 in accordance with the drive signal $S_{dr}$ from the arithmetic control means 3.

In this case, the arithmetic control means 3 includes a low pass filter 7 which is a combination of a notch filter 5 and an elliptical function filter 6, and suppresses the resonance characteristics of the controlled device 1 by means of the low pass filter 7.

Further, the low pass filter 7 may be constructed so as to be turned on and off, and an initial value to suppress the resonance characteristics by means of the low pass filter 7 is given when the low pass filter 7 is turned off, which will be described in detail hereinafter.

Figure 7:
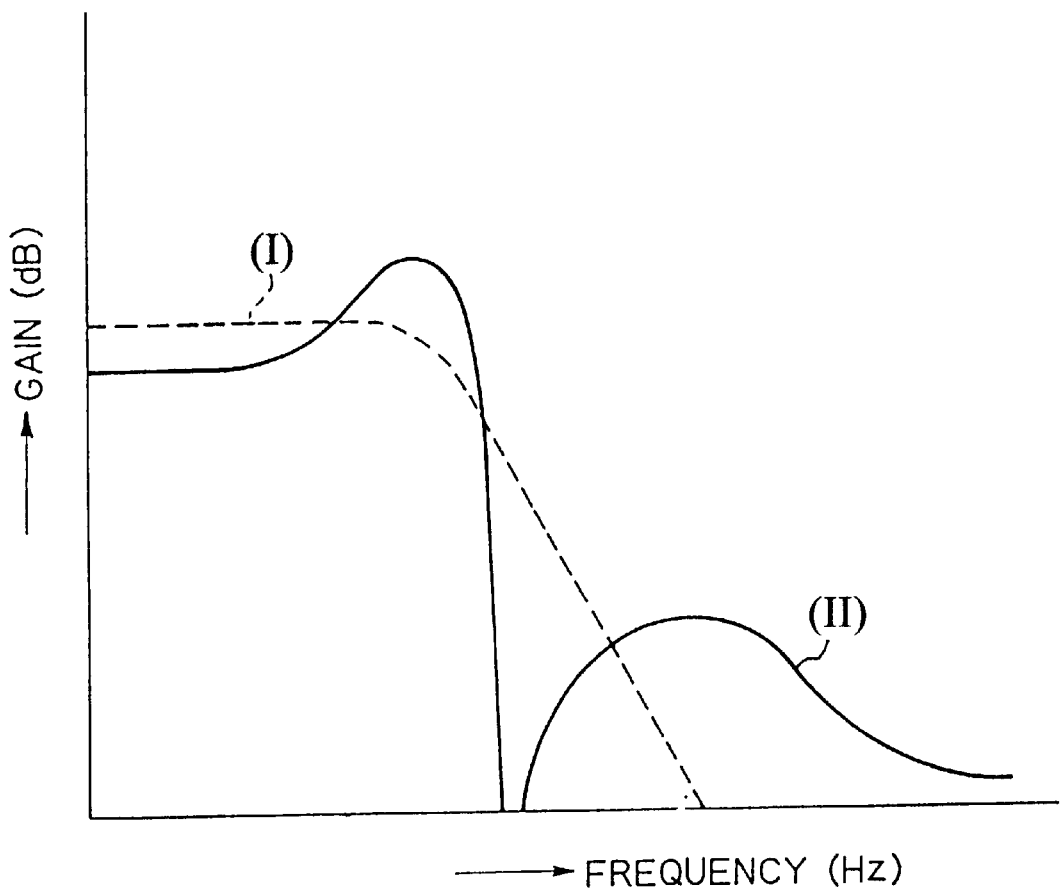
FIG. 7 is a simplified graph showing the transfer characteristics of an elliptical function filter of FIG. 6.

The arithmetic control means 3 includes the loop compensator 8, the notch filter 5, and the elliptical function filter 6, and suppresses the resonance characteristics by means of the low pass filter 7 including the notch filter 5 and the elliptic function filter 6, which replace the notch filter group of the prior art. For instance, the lowest resonance frequency can be eliminated by causing a notch center frequency of the notch filter 5 to coincide therewith, and the second lowest or the higher resonance frequency can be eliminated altogether by a damping characteristic of the elliptical function filter 6 higher than a cut-off frequency. In this case, it should be noted that the lowest resonance frequency is relatively stable and can be accurately allowed to coincide with the notch center frequency. Accordingly, the resonance characteristic can be suppressed by the elliptical function filter 6 even if a resonance frequency other than the lowest frequency varies due to the variation thereof for each device, such as a magnetic disk drive, or a temperature change. The gain-frequency characteristics of the elliptical function filter are shown in FIG. 7 by a solid line II, together with those of a usual low pass filter indicated by a dotted line (I). Although the characteristics are such that the gain is increased immediately before the cut-off frequency of the elliptical function filter 6, such a characteristic can be suppressed by the notch filter 5. Thus, the resonance characteristics can be suppressed in a simple filter construction.

As will be described hereinafter, during a speed control period in a process to move the controlled device to the designated position, a filter calculation may be omitted such as in a case where the positioning is carried out after the controlled device reaches the designated position. The low pass filter 7 is turned off in this case, and is turned on when the operation proceeds to a positioning control. Since an input/output state of the low pass filter 7 is uncertain when the low pass filter 7 is off, a time required to stabilize a control loop may become long when the state of the low pass filter 7 is changed from off to on. In view of this, an initial value is given when the low pass filter 7 is off so as to stabilize the control loop at high speed when the low pass filter 7 is turned on.

Figure 8:
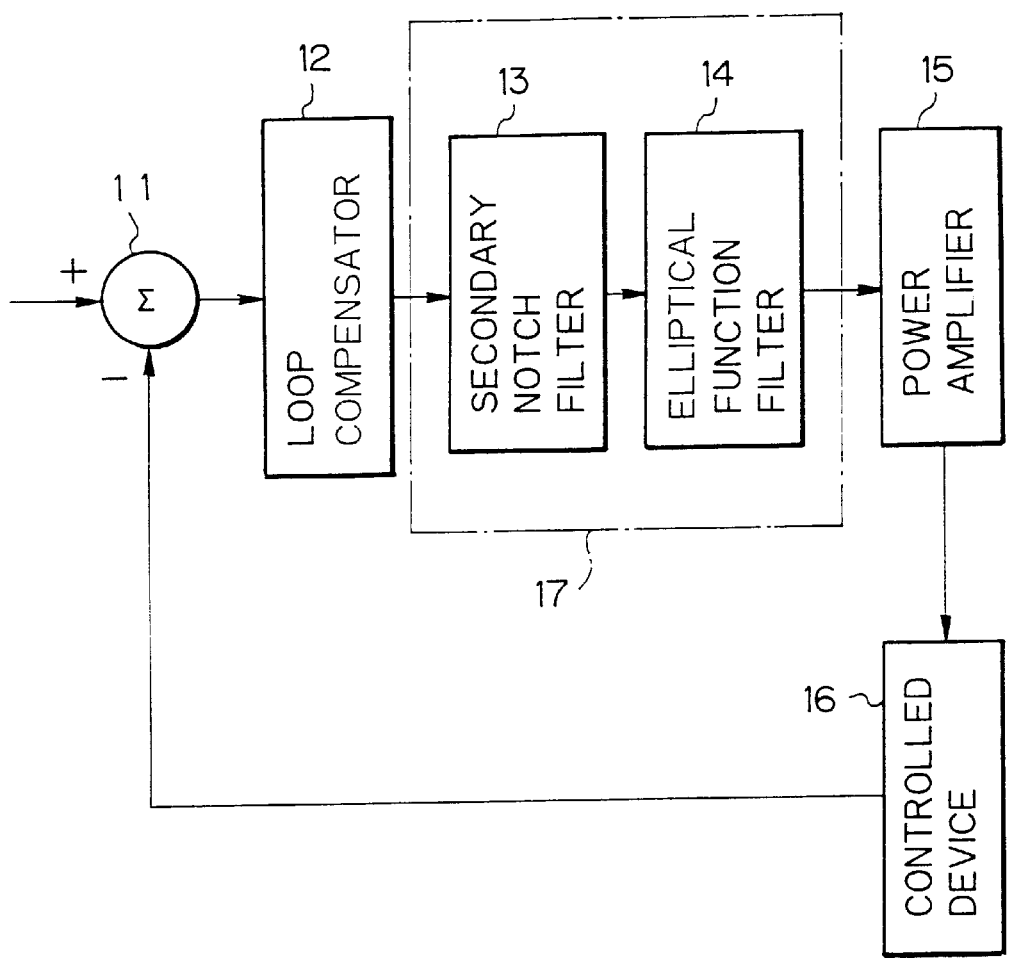
FIG. 8 is a block diagram showing a positioning control system in a concrete embodiment according to the present invention.

FIG. 8 is a block diagram showing a positioning control system in a concrete embodiment according to the present invention. The reference numeral 11 denotes an adder circuit, 12 a loop compensator, 13 a secondary notch filter, 14 an elliptical function filter, 15 a power amplifier, 16 a controlled device, and 17 a low pass filter (also referred to as a vibration suppressing filter). A difference between a designated position address (e.g., track address) sent from a host device and a position detection signal of the controlled device 1 is obtained in the adder circuit 11. The controlled device 16 is controlled through the loop compensator 12, the low pass filter 17, and the power amplifier, thereby being positioned at the designated position.

Preferably, the low pass filter 17 in this embodiment includes a combination of the secondary notch filter 13 and the elliptic function filter 14. A transfer function of the filter 17 is expressed in the following equation (10). Here, the secondary notch filter 13 and the elliptical function filter 14 have transfer functions Gn(s) and Ge(s) as expressed in the following equations (11) and (12), respectively.

$$Gne(s) = Gn(s)Ge(s) \quad (10)$$

$$Gn(s) = \frac{s^2 + 2\zeta_n \omega_n d_n s + \omega_n^2}{s^2 + 2\zeta_n \omega_n s + \omega_n^2} \quad (11)$$

$$G_{e2}(s) = \frac{d_e(s^2 + \omega_{ze}^2)}{s^2 + 2\zeta_e \omega_e s + \omega_e^2} \quad (12)$$

Here, $\omega_e^2 = d_e \omega_{ze}^2$ in order to make the value of direct current gain 1.0. The equation (12) shows a case of a secondary elliptical function filter. Since it is complicated to calculate factors of the elliptical function filter 14, the factors may be obtained from a table based on a low (pass) band ripple Rp, a damping Rs in a high (blocking) band, a cut-off frequency Fc, and a degree N of the filter.

Figure 9:
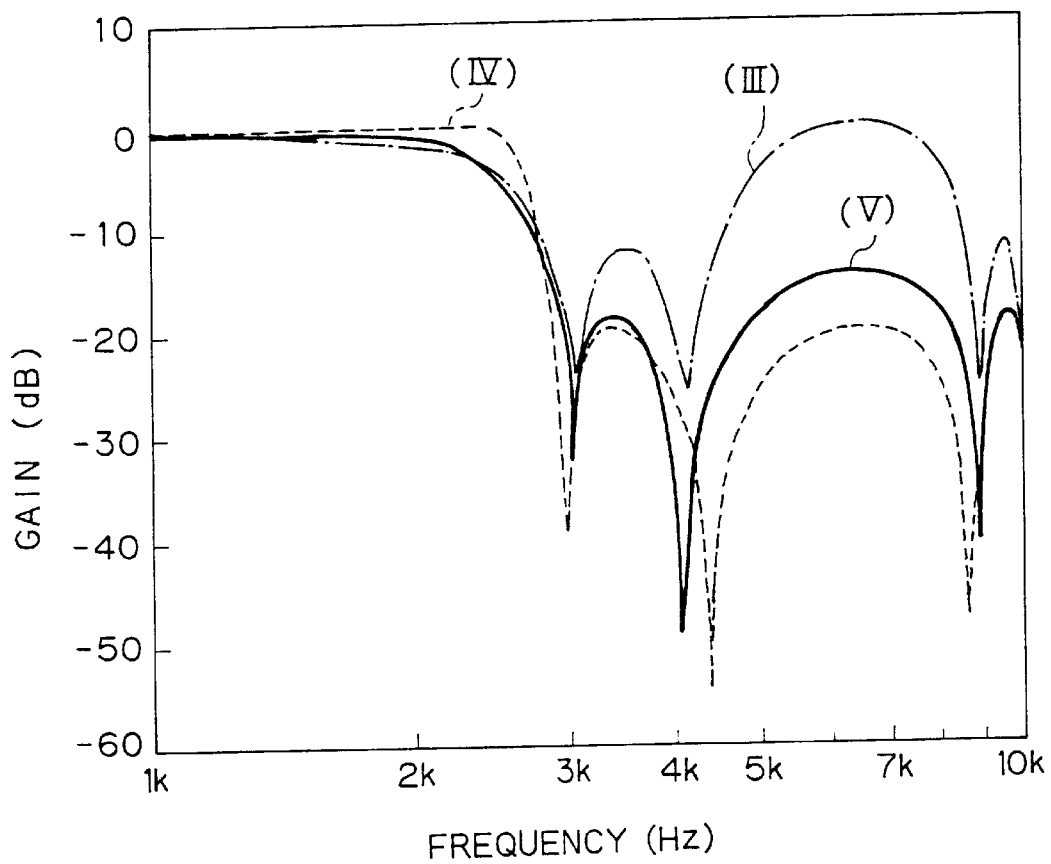
FIG. 9 is a graph showing a filter transfer function of FIG. 8 in terms of gain.
Figure 10:
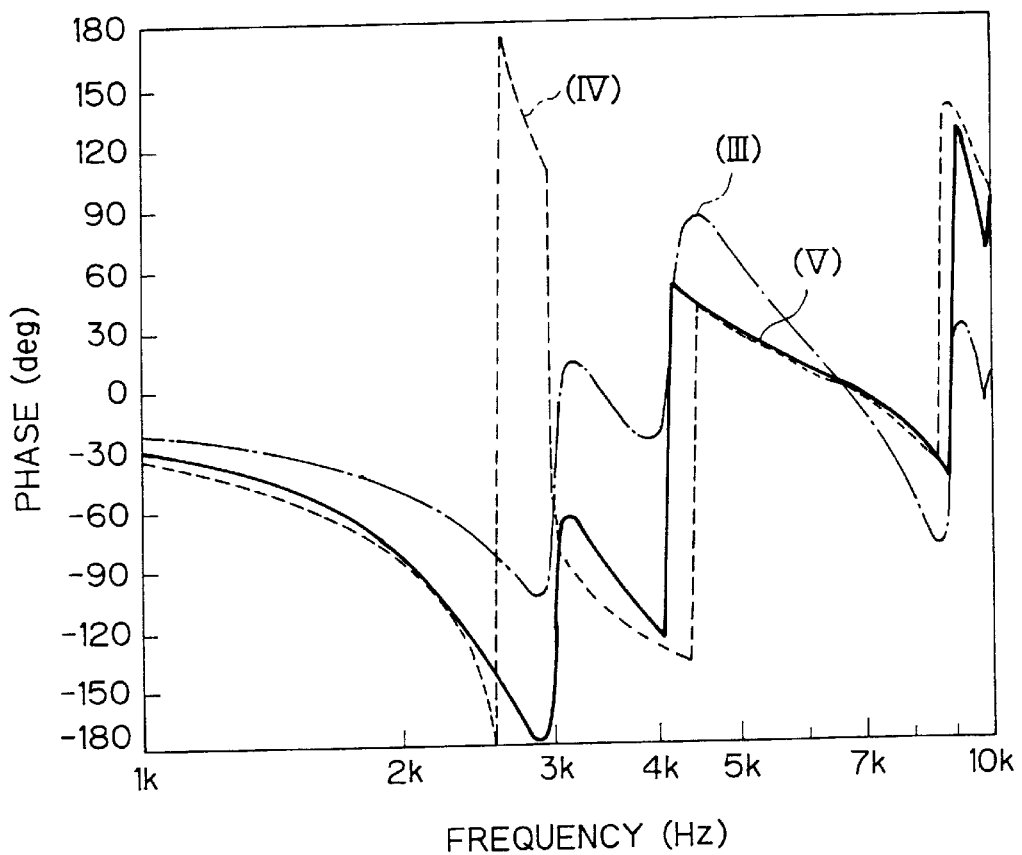
FIG. 10 is a graph showing a filter transfer function of FIG. 8 in terms of phase.

FIGS. 9 and 10 show filter transfer functions respectively. A dot-dash line curve (III), a dotted line curve (IV), and a solid line curve (V) respectively represent the concrete embodiment in cases where the secondary notch filters are connected at two stages, where the fourth degree elliptical function filter is used, and where the secondary notch filter and the secondary elliptical function filter are used. The case where the secondary notch filters are connected at two stages is expressed in the equation (13). The case where the fourth degree elliptical function filter is used is expressed in the equation (14). The case where the secondary notch filter and the secondary elliptical function filter are used is expressed in the equation (15).

$$Gn(s) = \frac{(s^2 + 2\zeta_{n1}\omega_{n1}d_{n1}s + \omega_{n1}^2)}{(s^2 + 2\zeta_{n1}\omega_{n1}s + \omega_{n1}^2)} \times \frac{(s^2 + 2\zeta_{n2}\omega_{n2}d_{n2}s + \omega_{n2}^2)}{(s^2 + 2\zeta_{n2}\omega_{n2}s + \omega_{n2}^2)} \quad (13)$$

where $\omega_{n1} = 2\pi \times 3000$, $d_{n1} = 10^{-(25/20)}$ (−25 dB)
$\zeta_{n1} = 0.3$
$\omega_{n2} = 2\pi \times 4100$, $d_{n2} = 10^{-(25/20)}$ (−25 dB)
$\zeta_{n2} = 0.7$ $$Ge(s) = \frac{d_{e1}(s^2 + \omega_{ze1}^2)}{(s^2 + 2\zeta_{e1}\omega_{e1}s + \omega_{e1}^2)} \times \frac{d_{e2}(s^2 + \omega_{ze2}^2)}{(s^2 + 2\zeta_{e2}\omega_{e2}s + \omega_{e2}^2)} \quad (14)$$

where $\omega_c = 2\pi \times 2400$, Rp = 0.1 dB, and Rs = 20 dB.

$$Gne(s) = \frac{(s^2 + 2\zeta_n \omega_n d_n s + \omega_n^2)}{(s^2 + 2\zeta_n \omega_n s + \omega_n^2)} \times \frac{d_e(s^2 + \omega_{ze}^2)}{(s^2 + 2\zeta_e \omega_e s + \omega_e^2)} \quad (15)$$

where $\omega_n = 2\pi \times 3000$, $d_{ul} = -25$ dB, $\zeta_{nl} = 0.3$ $\omega_c = 2\pi \times 2300$, Rp=1.0 dB, Rs=15 dB.

In the case where the notch center frequency of the first stage notch filter is 3 kHz, and that of the second stage notch filter is 4.1 kHz in the equation (13), gain-frequency characteristics are as represented by the dot-dash line curve (III) in FIG. 9 and a phase-frequency characteristics are as represented by the dot-dash line curve (III) in FIG. 10. Further, in the case where the cut-off frequency is 2.4 KHz, the low frequency band ripple Rp is 0.1 dB, and the damping Rs in the high frequency band is 20 dB in the equation (14), the gain-frequency characteristics are as represented by the dotted line curve (IV) in FIG. 9 and the phase-frequency characteristics are as represented by the dotted line curve (IV) in FIG. 10. In other words, the characteristics are such that the gain is increased immediately before the cut-off frequency, and the phase delay becomes a large value, compared with the other two cases.

As opposed to this, the gain-frequency characteristics are as represented by the solid line curve (V) in FIG. 9 and the phase-frequency characteristics are as represented by the solid line curve (V) in FIG. 10 in the case where the notch center frequency of the notch filter is set at 3 KHz, the cut-off frequency of the elliptical function filter is set at 2.3 kHz, the low frequency band ripple is set at 1.0 dB, and the damping Rs in the high frequency band is set at 15 dB in the equation (15) according to the embodiment of the present invention. In this case, it is important to cause the notch center frequency of the notch filter to coincide with the mechanical resonance frequency of the lowest degree and to cause the zero point frequency of the elliptical function filter to coincide with the mechanical resonance frequency of the second lowest degree.

Various known means can be used to obtain the factors of the elliptical function filter (e.g., A. B. Williams, "Electronic Filter Design Handbook", McGraw-Hill, New York, 1981). Further, the secondary elliptical function filter may consist of an operational amplifier, and an example thereof is described in the above reference. More conveniently, it is possible to use a commercially available program package "MATLAB". Thus, the notch filter 13 and the elliptical function filter 14 which correspond to and suppress the mechanical resonance characteristics of the controlled device 16 can be easily realized.

Figure 11:
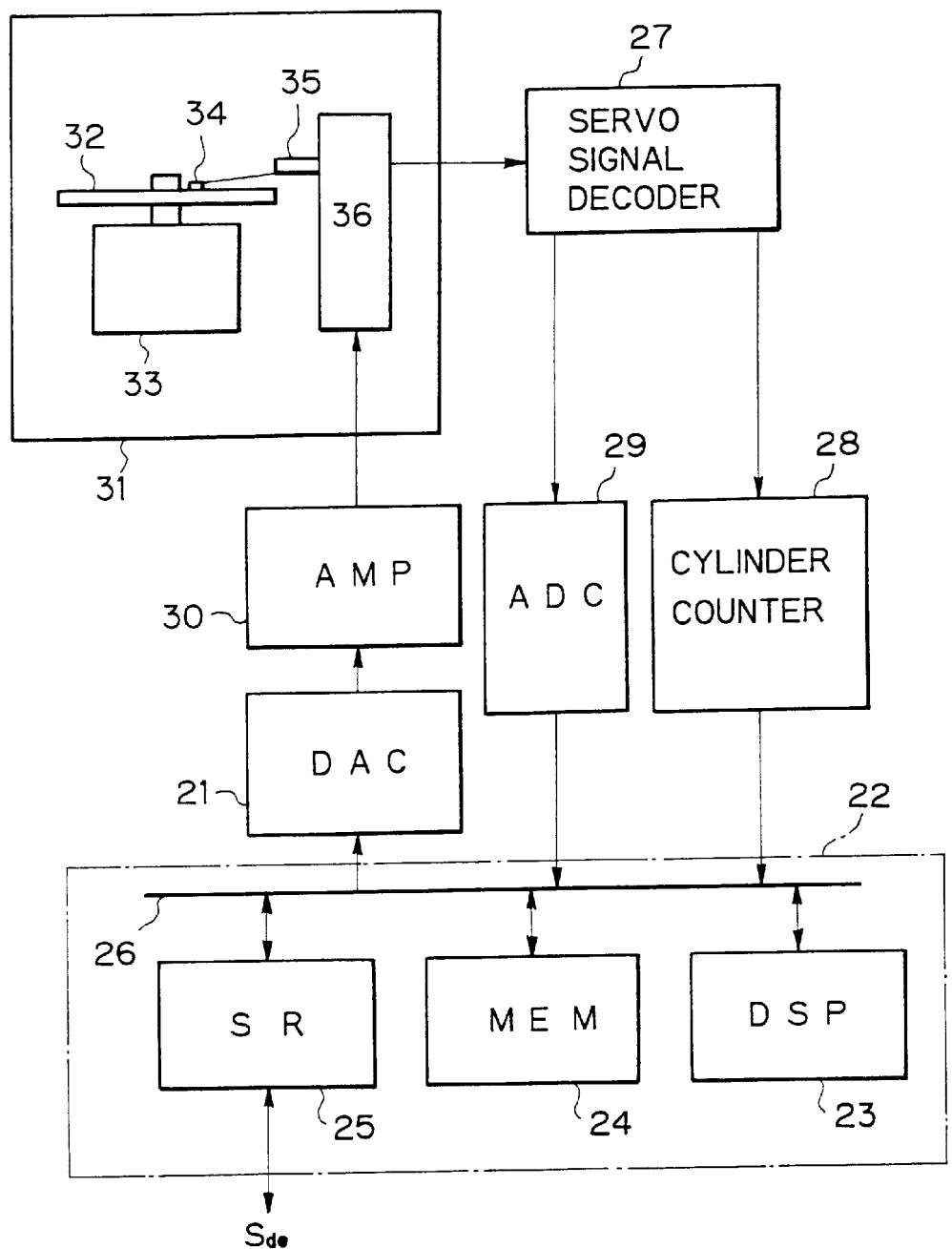
FIG. 11 is a block diagram showing an example in which the present invention is applied to a head positioning control system of a magnetic disk drive.

FIG. 11 is a block diagram showing an example in which the present invention is applied to a head positioning control system of a magnetic disk drive. In this case, the arithmetic control means 3 in FIG. 6 is constituted by a DSP (digital signal processor). In this figure, the reference numeral 21 denotes a DA converter (DAC), 22 an arithmetic controller, 23 a digital signal processor (DSP), 24 a memory (MEM), 25 a transfer register (SR), 26 a bus, 27 a servo signal decoder, 28 a cylinder counter, 29 an AD converter (ADC), 30 an amplifier (AMP), 31 a magnetic disk drive, 32 a magnetic disk, 33 a spindle motor, 34 a magnetic head, 35 a head arm, and 36 an actuator including a voice coil motor or the like.

Figure 1A:
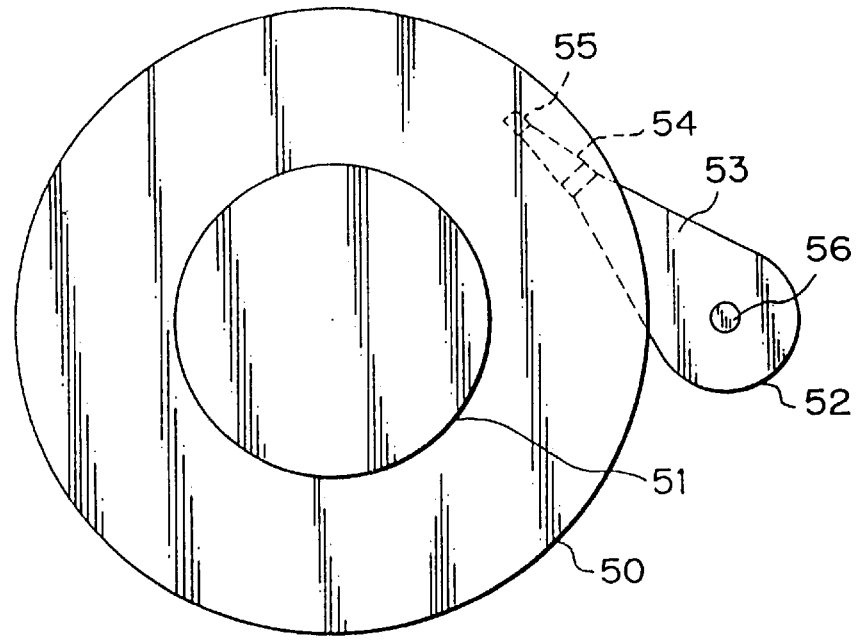
FIGS. 1(A) and 1(B) are a plan view and a side view of a magnetic disk drive, respectively.
Figure 1B:
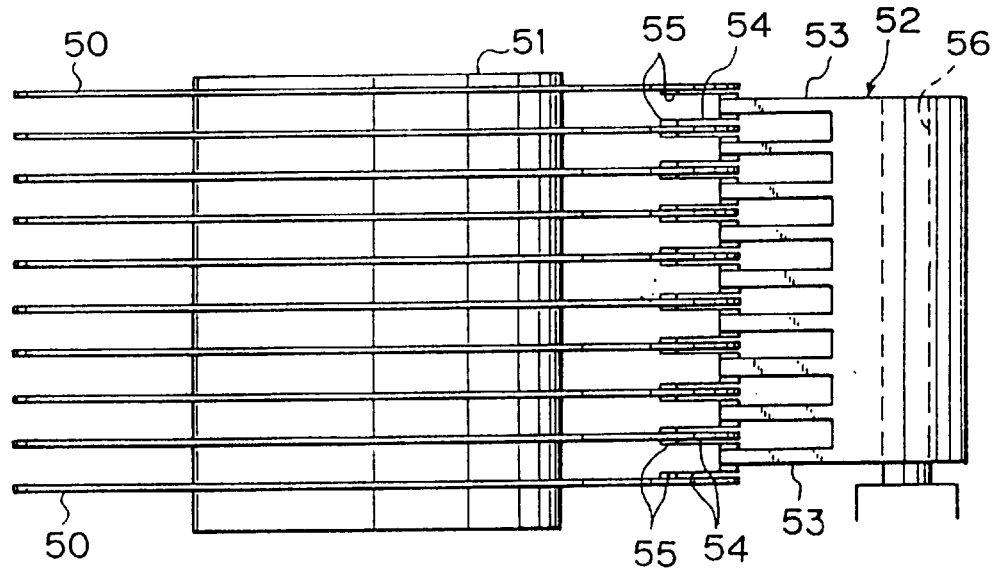
Figure 2:
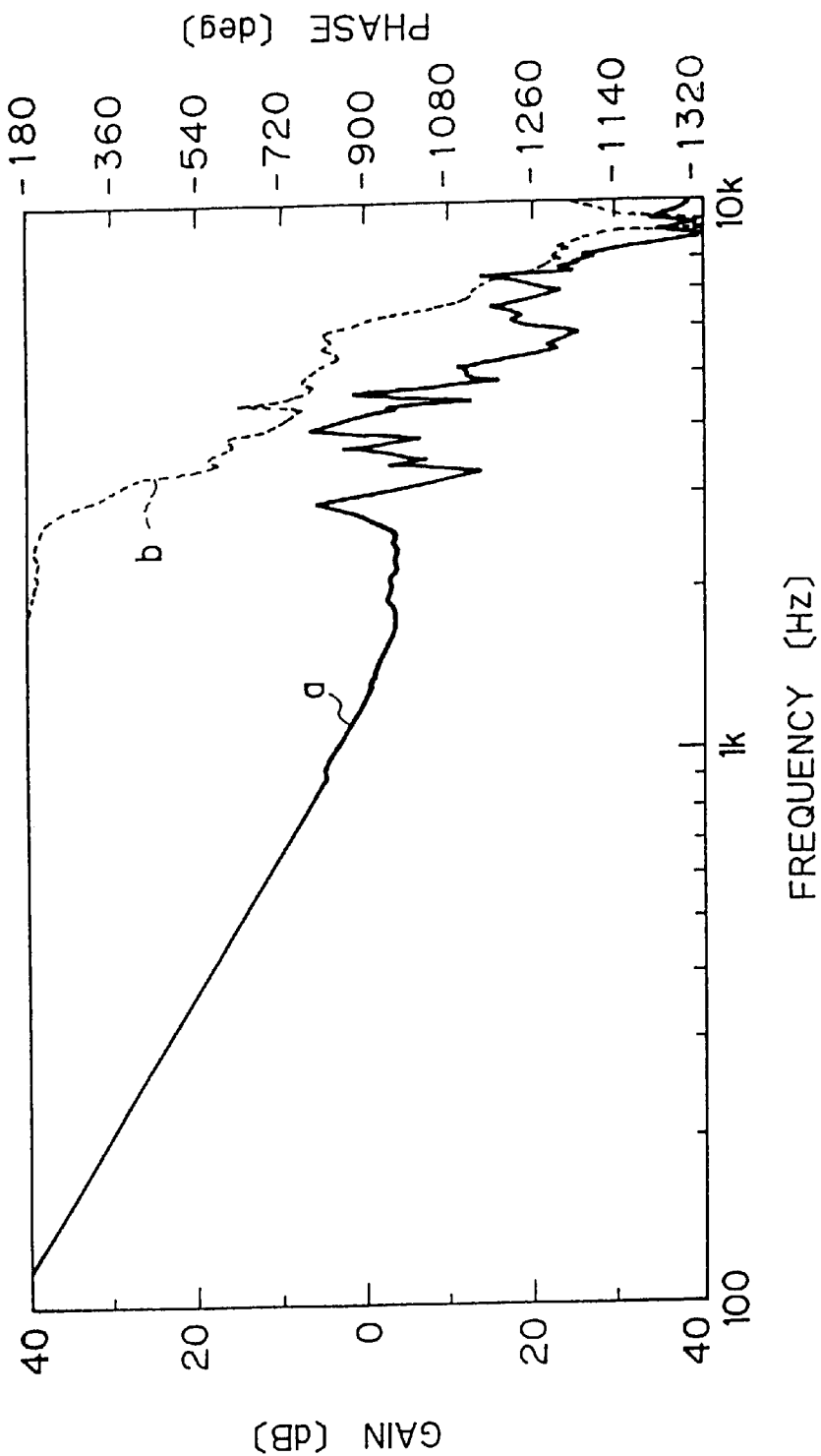
FIG. 2 is a graph showing exemplary transfer characteristics of an actuator.
Figure 3:
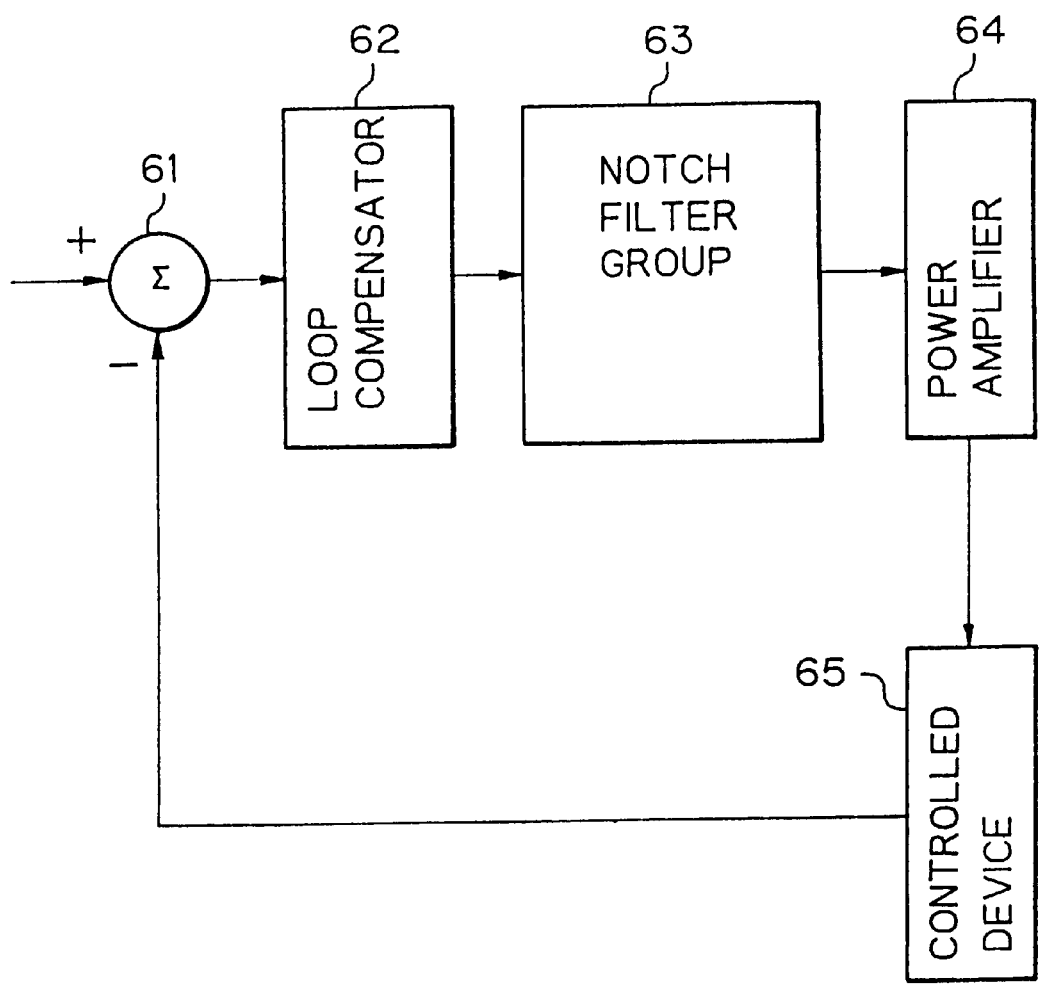
FIG. 3 is a block diagram showing a positioning control system according to the prior art.
Figure 4:
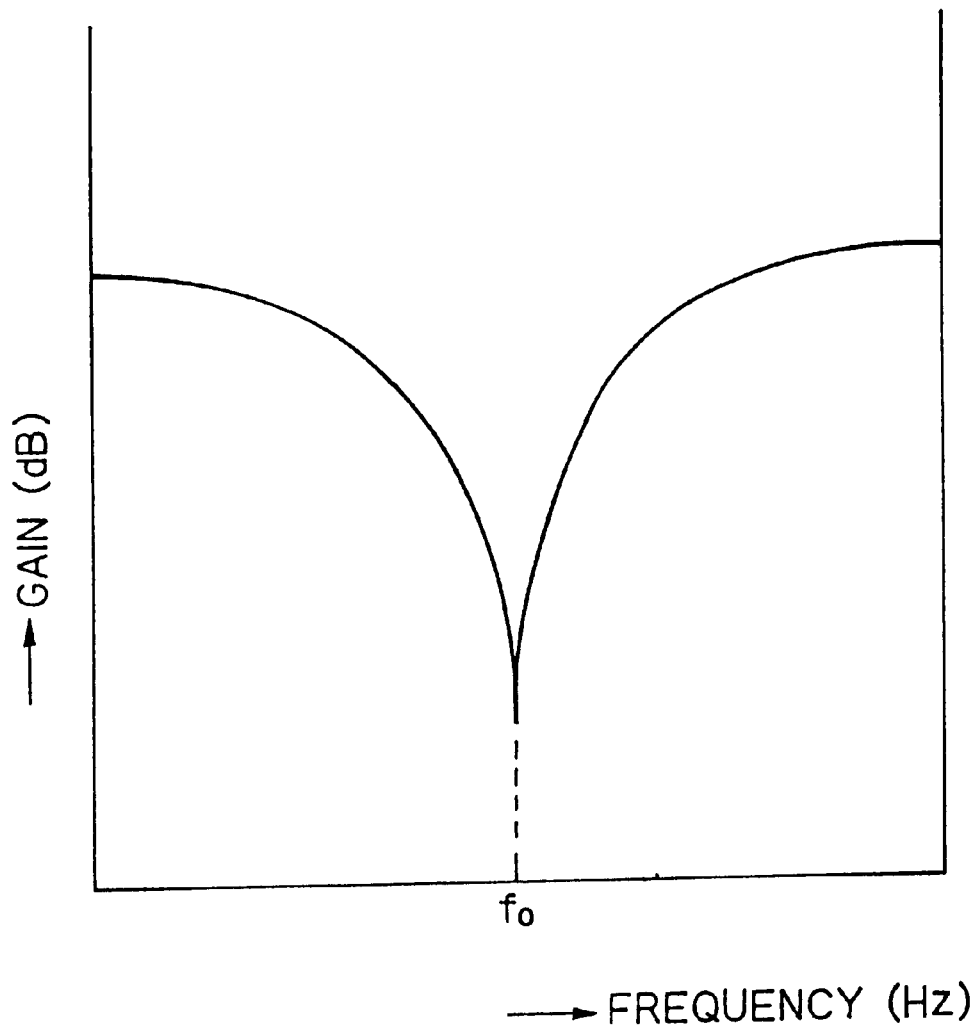
FIG. 4 is a simplified graph showing exemplary transfer characteristics of a notch filter.
Figure 5:
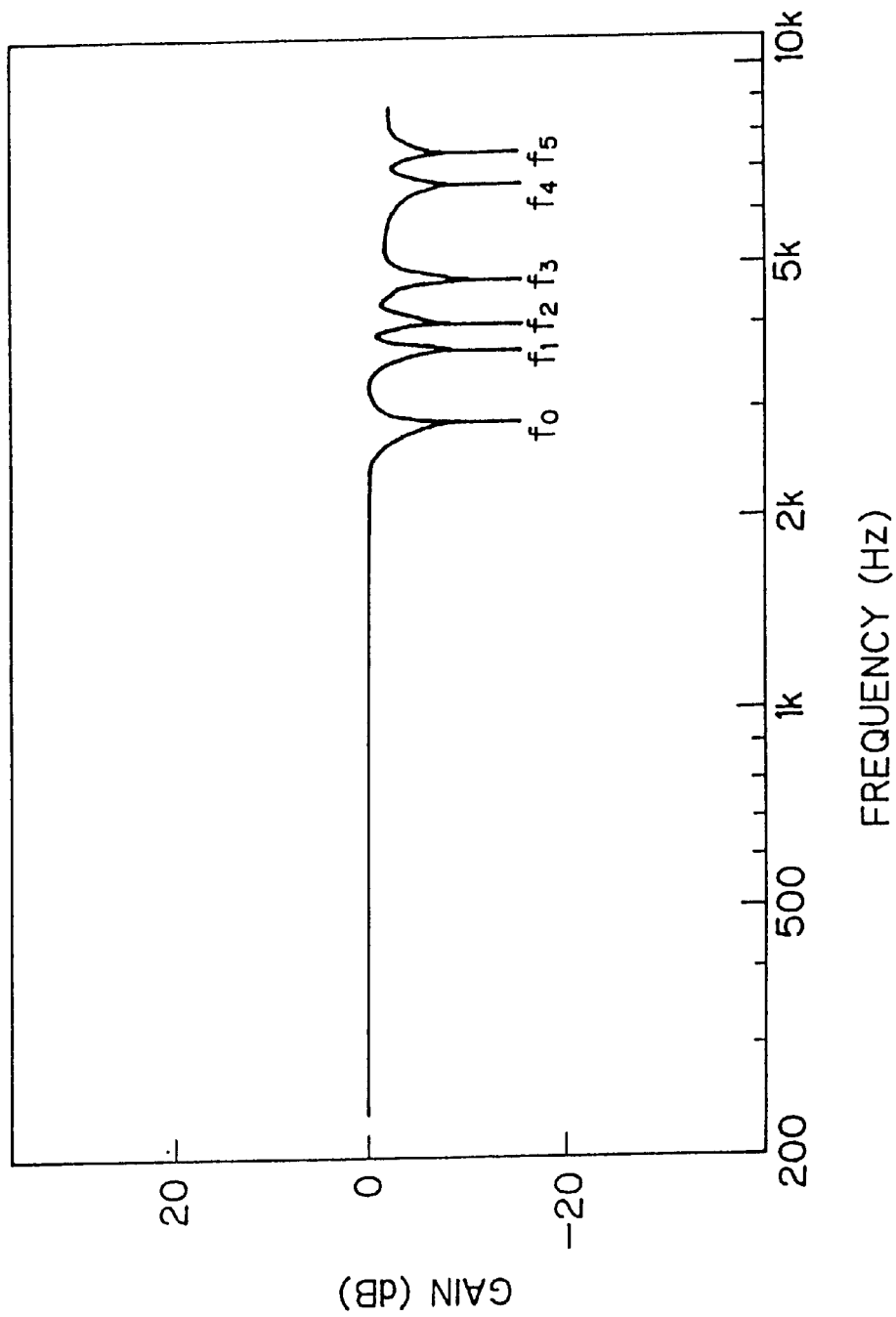
FIG. 5 is a graph showing the exemplary transfer characteristics of the notch filter group of FIG. 3.

The illustrated magnetic disk drive 31 has a simplified construction including the magnetic disk 32 which is rotated at a given speed by the spindle motor 33, and the actuator 36 which is so controlled as to move the head arm 35 having the magnetic head 34 mounted on a leading end thereof and to position the magnetic head 34 at a designated track position on the magnetic disk 32. The magnetic disk drive 31 may be constructed so as to have a number of magnetic disks and heads as shown in FIGS. 1(A) and 1(B). A construction including the amplifier 30 and a part of the actuator 36 corresponds to the drive means 4 in FIG. 6, and a construction including the head 34, the head arm 35, and a part of the actuator 36 corresponds to the controlled device 1 in FIG. 6.

The servo signal decoder 27 decodes a servo signal read from the magnetic disk 32 through the head 34. The cylinder counter 28 counts the counter number (track number) by counting the zero-crossing points of the decoded servo signal, and indicates the current position of the head 34 from the reference point by the cylinder number (track number). The moving distance of the head 34 (seek distance) corresponds to the number of tracks between the current track position and the designated track position. The AD converter 29 converts the decoded two-phase servo signal into a digital signal. A combination of the AD converter 29 and the cylinder counter 28 detects the current position of the head 34 from the reference point, and corresponds to the position detecting means 2 in FIG. 6. The DA converter 21 converts a drive control signal sent through the bus 26 from the digital signal processor 23 into an analog signal, which is amplified by the amplifier 30 to drive the actuator 16.

Figure 12:
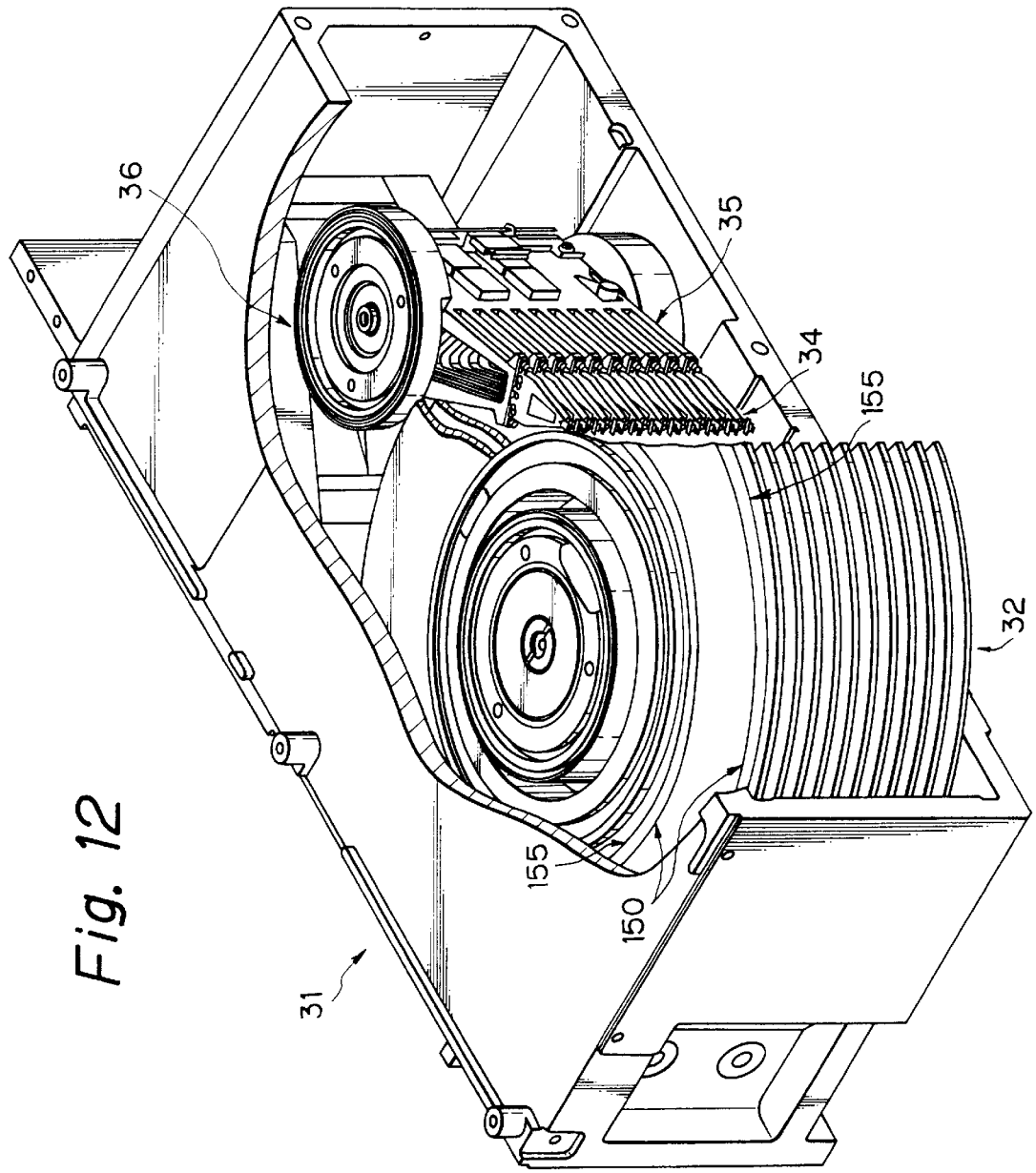
FIG. 12 is a perspective view, partially cut away, showing a mechanism of a magnetic disk drive.

Here, in order to facilitate understanding of the construction of magnetic disk drive 31 in FIG. 11, a partially sectional plan view showing a perspective view, partially cut away, showing a mechanism of one magnetic disk drive is illustrated in FIG. 12. Hereinafter, the same components as mentioned before will be referred to using the same reference numerals. As seen from FIG. 12, a plurality of magnetic disks (e.g., eleven magnetic disks) 32 are rotated simultaneously. The tracks on a recording surface of each disk 32 are written with a predetermined data pattern. However, the tracks at both ends of the inner zone and the outer zone of the disk 32 are formed as guard bands 150 in which a particular pattern is written, instead of a data pattern, the particular pattern being used for stopping a seek operation of a plurality of magnetic heads. These magnetic heads 34 and head arms 35 are provided on the upper and lower surfaces of the respective disks 32. Further, at the inner and the outer sides of the guard band 150, an erase zone 155 is formed for mechanically stopping the heads 34.

Returning to FIG. 11, the arithmetic controller 22 corresponds to the arithmetic control means 3 in FIG. 6, and includes the digital signal processor 23, the memory 24, and the transfer register 25. In accordance with an address signal or the like from a host device, the digital signal processor 23 calculates the moving distance of the head 34 between the current position and the designated position, calculates the target trajectory corresponding to the calculated moving distance, and controls the actuator 36 so that the head 34 follows the calculated target trajectory. In this case, the digital signal processor 23 executes an operational processing which realizes the functions of the loop compensators 8, 12, the notch filters 5, 13, and the elliptical function filters 6, 14 as described above.

Here, it should be noted that the digital calculation of such a low pass filter requires a relatively long time. However, without the low pass filter, the residual vibration of the magnetic head after a seek operation of each magnetic head is completed continues for a relatively long time. Therefore, a long time is also required to perform write/read operation stably, if the low pass filter is not used.

Figure 13:
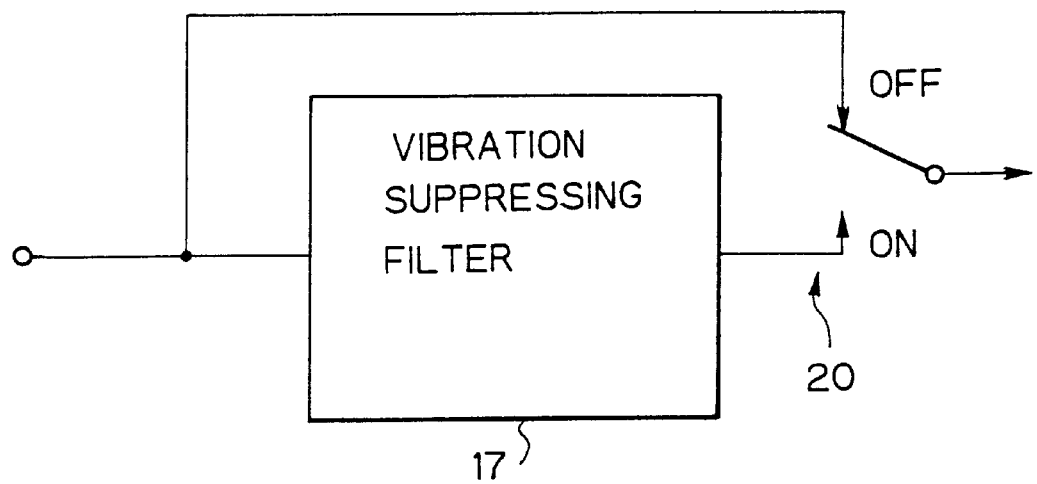
FIG. 13 is a simplified block diagram for explaining the condition where a vibration suppressing filter of FIG. 8 is turned on and off.
Figure 14:
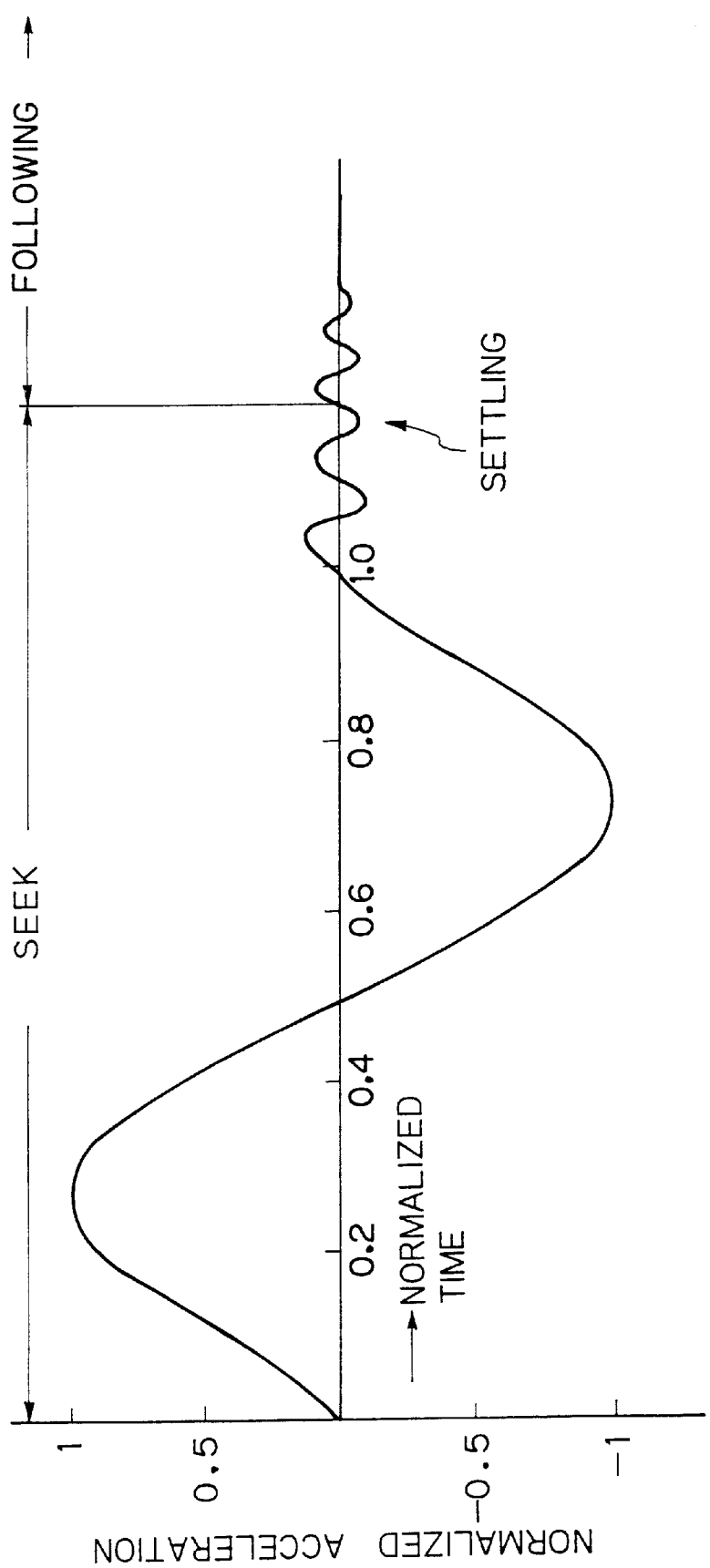
FIG. 14 is a simplified graph for explaining a role of a vibration suppressing filter of FIG. 13.

To address this disadvantage, it is deemed to be preferable that the low pass filter (vibration suppressing filter) 17 including the elliptical function filter is turned off and turned on by means of switching means 20, as shown FIG. 13. To be more specific, during the seek operation of each magnetic head in FIG. 14, the low pass filter is turned off since the magnetic head moves at a higher acceleration and the resonance characteristics become negligible. On the other hand, during the settling operation and the following operation thereafter, the magnetic head must be positioned at a designated track position with high accuracy and therefore the magnetic head moves at a lower acceleration and the resonance characteristics become significant. However, if the elliptical function filter remains in an off state, the residual vibration in the settling operation is likely to continue, as shown in FIG. 14. On the contrary, if the low pass filter 17 is turned on during the settling and following operation, the residual vibration can be suppressed assuredly.

Figure 15:
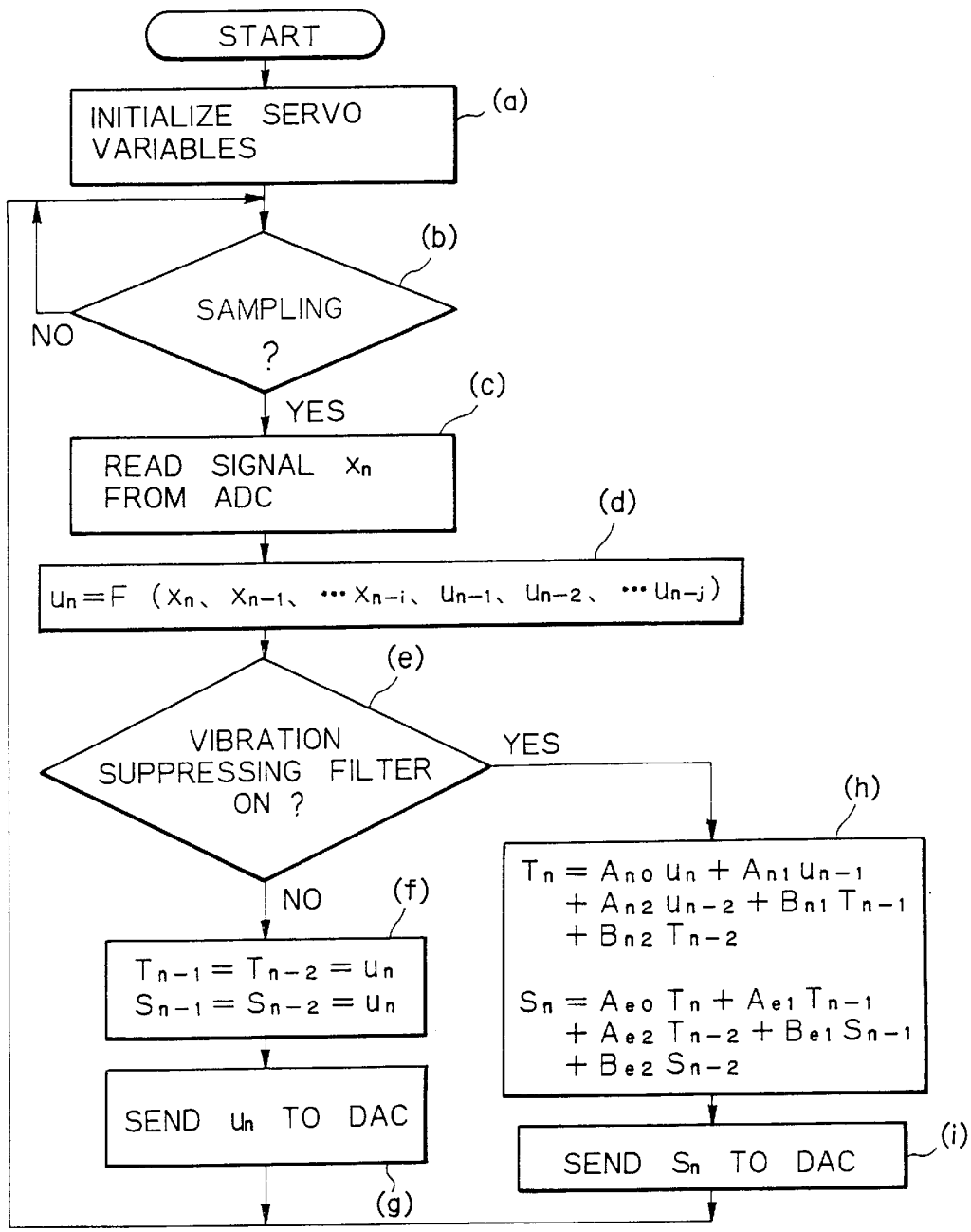
FIG. 15 is a flowchart for explaining an operation of a head positioning control system of FIG. 11.

FIG. 15 is a flowchart for explaining an operation of a head positioning control system of FIG. 11. The operational processing in the arithmetic controller 22 which realizes the function of the low pass filter including the notch filter and the elliptical function filter is shown in Steps (a) to (i). More specifically, servo variables are initialized in Step (a), and it is discriminated whether or not a sampling time is on in Step (b). If the sampling time is on, a position detection signal $x_n$ is read by the AD converter (ADC) 29 in Step (c). Subsequently, a drive control signal $u_n$ is set as $u_n = F(X_n, X_{n-1}, \ldots, X_{ni}, U_{n-1}, U_{n-2}, \ldots, U_{n-j})$ in Step (d). It is selected whether or not the vibration suppressing filter (low pass filter) including the notch filter and the elliptical function filter should be turned on in Step (e). This is because the vibration suppressing filter is preferably turned off so as to drive the actuator 36 by causing the current to vary at a large amplitude during a seek operation, in the case where the operations are roughly divided into the seek operation and a following operation as in the magnetic disk drive. During the seek operation, the vibration suppressing filter (low pass filter) is turned off. On the other hand, the vibration suppressing filter (low pass filter) is turned on when the positioning is carried out at high speed and with high accuracy during the following operation.

The following equation (16) representing the characteristics of vibration suppressing filter (low pass filter) $T_n$ at the first stage corresponds to the discrete representation of the function relating to the equation (11) of the notch filter.

$$T_n = A_{n0}u_n + A_{n1}u_{n-1} + A_{n2}u_{n-2} + B_{n1}T_{n-1} + B_{n2}T_{n-2} \tag{16}$$

$$Gn'(s) = \frac{s^2 + 2\zeta_n \omega_{n'} d_n s + \omega_{n'}^2}{s^2 + 2\zeta_n \omega_{n'} s + \omega_{n'}^2} \tag{17}$$

$$s = \frac{2}{T_s} \times \frac{1 - Z^{-1}}{1 + Z^{-1}} \tag{17'}$$

$$A_{n0} = \frac{t^2 + 2\zeta_n d_n t + 1}{t^2 + 2\zeta_n t + 1} \tag{17a}$$

$$A_{n1} = \frac{2(t^2 - 1)}{t^2 + 2\zeta_n t + 1} \tag{17b}$$

$$A_2 = \frac{t^2 - 2\zeta_n d_n t + 1}{t^2 + 2\zeta_n t + 1} \tag{17c}$$

$$B_{n1} = -A_{n1} \tag{17d}$$

$$B_{n2} = -\frac{t^2 - 2\zeta_n d_n t + 1}{t^2 + 2\zeta_n t + 1} \tag{17e}$$

$$\text{where}, t = \tan\left(\frac{\omega_n T_s}{2}\right)$$

Here, a sampling period is assumed as Ts. Usually, after an S-Z transformation in a bilinear form, the notch angular frequency $\omega_n$ is likely to be shifted. To compensate for this frequency shift, the notch angular frequency $\omega_n'$ is adjusted previously (prewarped) into $\omega_n'$, where $\omega_n' = (2/\text{Ts}) \tan(\omega_n \text{Ts}/2)$, and the equation (17) in which the notch angular frequency $\omega_n$ is replaced with $\omega_n'$ is bilinearly transformed (also referred to as Tustin transformation) with the equation (17'), whereby the equation (16) is obtained. In other words, $A_{n0}$, $A_{n1}$, $A_{n2}$, $B_{n1}$, and $B_{n2}$ are as shown in the equations (17a) to (17e).

Similarly, the following equation (18) representing the characteristics of the vibration suppressing filter $S_n$ (low pass filter) at the second stage can be obtained, if the angular frequency $\omega_{ze}$ at a zero point in the equation (12) representing a transfer function of the secondary elliptical function filter is prewarped into $\omega_{ze}'$, where $\omega_{ze}' = (1/\text{Ts}) \tan(\omega_{ze} \text{Ts}/2)$, and the equation (12) having $\omega_{ze}$ replaced with $\omega_{ze}'$ is bilinearly transformed.

$$S_n = A_{e0}T_n + A_{e1}T_{n-1} + A_{e2}T_{n-2} + B_{e1}S_{n-1} + B_{e2}S_{n-2} \tag{18}$$

$$A_{e0} = \frac{d_e(t^2 + 1)}{k^2 + 2\zeta k + 1} \tag{19a}$$

$$A_{e1} = \frac{2d_e(t^2 - 1)}{k^2 + 2\zeta k + 1} \tag{19b}$$

$$A_{e2} = A_{e0} \tag{19c}$$

$$B_{e1} = \frac{2(k^2 - 1)}{k^2 + 2\zeta k + 1} \tag{19d}$$

$$B_{e1} = \frac{k^2 - 2\zeta k + 1}{k^2 + 2\zeta k + 1} \tag{19e}$$

$$\text{where}, t = \tan\left(\frac{Ts\omega_{ze}}{2}\right), k = \frac{Ts\omega_e}{2}$$

In other words, $A_{e0}$, $A_{e1}$, $A_{e2}$, $B_{e1}$, and $B_{e2}$ are as shown in the equations (19a) to (19e).

The operational processing as mentioned above is carried out in Step (h), and the calculation result in accordance with the equation (18) is output to the DA converter (DAC) 21 in Step (i). The analog signal obtained through the DA converter 21 is amplified by the amplifier 30, and applied to the actuator 36 to thereby suppress the mechanical resonance characteristics including the head arm 35.

In the case where the vibration suppressing filters (low pass filters) are turned off, the vibration suppressing filters at the first and second stages do not execute the filter calculation as shown $T_{n-1} = T_{n-2} = U_n$ and $S_{n-1} = S_{n-2} = u_n$ in Step (f). In this way, the vibration suppressing filters (low pass filter) are turned off and the output $u_n$ in Step (d) is applied to the AD converter 21. The converted analog signal is amplified by the amplifier 30 to drive the actuator 36. In this case, the initial value is continuously given lest a transient response should be produced when the vibration suppressing filters (low pass filter) are turned on.

Figure 16:
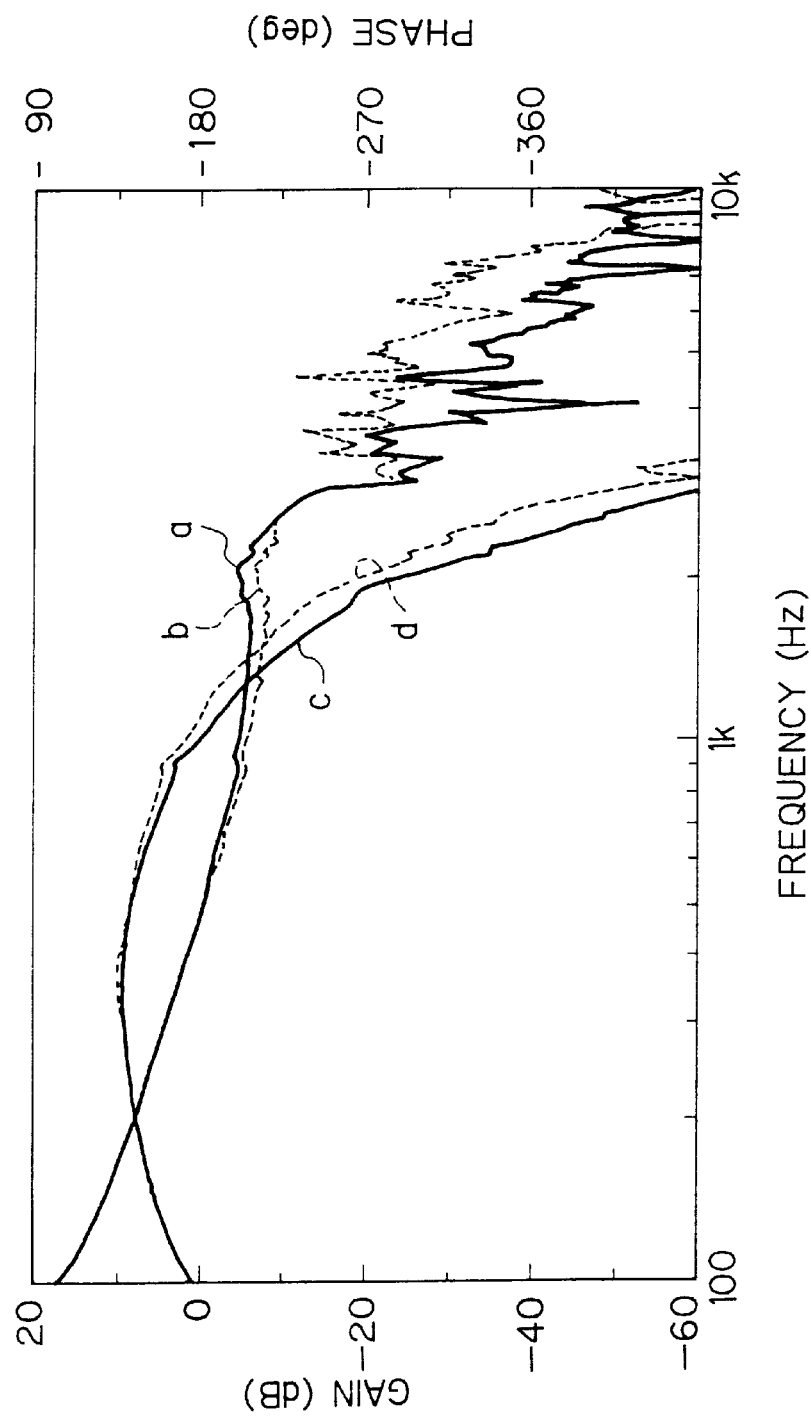
FIG. 16 is a graph showing open loop transfer characteristics for clarifying the difference between the present invention and the prior art.

FIG. 16 is a graph showing an open loop transfer characteristics. In this graph, solid line curves (a), (c) represent gain-frequency characteristic and phase-frequency characteristic in the embodiment according to the present invention, respectively, whereas dotted line curves (b), (d) represent gain-frequency characteristics and phase-frequency characteristic of the prior art, respectively. It can be seen from this graph that the mechanical resonance characteristic can be sufficiently suppressed by the low pass filter which is a combination of the notch filter and the elliptic function filter according to the present invention when compared to the prior art.

Although the vibration suppressing filters (low pass filters) are realized by the digital calculating function in the foregoing embodiment, it may be realized by an analog circuit including an operational amplifier and the like. Further, the invention is applicable not only to a magnetic disk drive, but also to a magnet-optical disk drive, an optical disk drive, a printer, or the like device which includes a controlled device that has various mechanical resonance modes and that is required to be controlled and positioned with high accuracy, such as at least one head.

As described above, according to the present invention, the resonance characteristic of a controlled device are suppressed by a low pass filter which is a combination of a notch filter and an elliptical function filter. Unlike the prior art, the control system according to invention does not include a number of notch filters, and thus is allowed to have an economical construction. In the case of a digital processing, the response characteristic can be improved since an operational processing time is shortened. Further, in the case where the low pass filter is realized by an analog circuit, the control system can be advantageously made small in size. The control system is further advantageous in that the mechanical resonance characteristics can be sufficiently suppressed by the elliptic function filter even if there are variations and aging in the mechanical resonance characteristics.

In the case where the control system is constructed such that the low pass filter is turned on and off, operation of the low pass filter is stopped when a drive current varies at a large amplitude such as during a seek operation. This allows the operational processing to be omitted in the case of the digital processing, thereby improving the response characteristics. As in the case where the operation proceeds from the seek operation to a following operation, the low pass filter is turned on to suppress the resonance characteristics. Accordingly, the controlled device can be positioned with high accuracy, and an initial value is given when the low pass filter is turned off. Thus, the control system is advantageous in executing a stable control when the state of the low pass filter is changed from off to on.

What is claimed is:

1. A positioning control system comprising:
   a controlled device which has resonance characteristics, including resonance frequencies, and is positionable at a designated position;
   position detecting means for detecting a moved position of the controlled device;
   arithmetic control means for generating a drive signal based on a position detection signal from the position detecting means and based on said designated position; and
   drive means for moving the controlled device in accordance with said drive signal from said arithmetic control means, said arithmetic control means includes a low pass filter which has an abrupt slope and a discontinuous pole in the gain-frequency characteristics thereof, so that said resonance frequencies of said controlled device can be suppressed by means of said low pass filter, said arithmetic control means further comprising switch means for selectively turning said low pass filter off and on
   wherein said switch means selectively turns said low pass filter off during a seek operation of said controlled device and on during a settling operation of said controlled device and wherein said low pass filter comprises a notch filter having said abrupt slope for suppressing a lowest resonance frequency and an elliptical function filter having said pole for suppressing a second lowest, or hither, resonance frequency.

2. A positioning control system as set forth in claim 1 wherein an initial value is given to said low pass filter when it is turned off.

3. A positioning control system comprising:
   a controlled device which has resonance characteristics, including resonance frequencies, and is positionable at a designated position;
   position detecting means for detecting a moved position of the controlled device;
   arithmetic control means for generating a drive signal based on a position detection signal from the position detecting means and based on said designated position; and
   drive means for moving the controlled device in accordance with said drive signal from said arithmetic control means,
   said arithmetic control means includes a low pass filter which has an abrupt slope and a discontinuous pole in the gain-frequency characteristics thereof, so that said resonance characteristics of said controlled device can be suppressed by means of said low pass filter, said arithmetic control means further comprising switch means for selectively turning said low pass filter off and on;
   wherein said switch means selectively turns said low pass filter off during a seek operation of said controlled device and on during a settling operation of said controlled device;
   wherein said low pass filter is constituted by a combination of a notch filter having said abrupt slope and an elliptical function filter having said pole, so that all the resonance frequencies occurring in said resonance characteristics can be suppressed; and
   wherein said low pass filter is constructed so as to be turned on and off, and an initial value to suppress the resonance characteristics by means of said low pass filter is given when said low pass filter is turned off.

4. A positioning control system as set forth in claim 3, wherein said arithmetic control means further comprises a digital signal processor which executes the calculation of said low pass filter by digital computation.

5. A positioning control system as set forth in claims 1 or 4 wherein said controlled device includes at least one magnetic head which is movable on at least one magnetic disk and includes a part of an actuator for positioning said magnetic head at a designated track position on said magnetic disk, and wherein said drive means includes an amplifier for amplifying said drive signal and includes another part of said actuator.

6. A positioning control system as set forth in claims 1 or 4 wherein said controlled device includes at least one optical head and includes a part of an actuator for positioning a optical disk head at a designated position on an optical disk, and wherein said drive means includes an amplifier for amplifying said drive signal and includes another part of said actuator.

7. A positioning control system as set forth in claims 1 or 4 wherein said controlled device includes at least one print head which is movable on a printing sheet and includes a part of an actuator for positioning said print head at a designated position, and wherein said drive means includes an amplifier for amplifying said drive signal and includes another part of said actuator.

8. A positioning control system for controlling a magnetic disk drive including:
   at least one magnetic disk which is rotated at a given speed by a spindle motor;
   at least one magnetic head which has resonance characteristics, including resonance frequencies, and is positionable at a designated position on said magnetic disk; and
   an actuator controlled to move said magnetic head, wherein said system comprises;
   position detecting means for detecting a moved position of said magnetic head;
   arithmetic control means for generating a drive signal based on a position detection signal from the position detecting means and based on said designated position; and drive means for moving said magnetic head in accordance with said drive signal from said arithmetic control means, wherein said arithmetic control means includes a low pass filter which has an abrupt slope and a discontinuous pole in the gain-frequency characteristics thereof, so that said resonance characteristics of said magnetic head can be suppressed by means of said low pass filter, said arithmetic control means further comprising switch means for selectively turning said low pass filter off and on wherein said switch means selectively turns said low pass filter off during a seek operation of said magnetic head and on during a settling operation of said magnetic head and wherein said low pass filter comprises a notch filter having said abrupt slope and an elliptical function filter having said pole, so that all the resonance frequencies occurring in said resonance characteristics can be suppressed.

9. A positioning control system as set forth in claim 8, wherein said arithmetic control means includes a digital signal processor which calculates the moving distance of said magnetic head between the current position and the designated position, and which controls said actuator so that said magnetic head follows the calculated moving distance, and wherein said arithmetic control means is adapted to realize a function of said low pass filter.

10. A positioning control system as set forth in claim 8, wherein said drive means includes an amplifier for amplifying said drive signal and a part of said actuator for moving said magnetic head in accordance with the amplified drive signal.

11. A positioning control system as set forth in claim 8 wherein an initial value is given to said low pass filter when it is turned off.

* * * * *

UNITED STATES PATENT AND TRADEMARK OFFICE
CERTIFICATE OF CORRECTION

PATENT NO. : 6,014,285
DATED : January 11, 2000
INVENTOR(S) : Okamura

It is certified that error appears in the above-indentified patent and that said Letters Patent is hereby corrected as shown below:

In Claim 1, line 28, delete "hither" and insert

--higher-- therefor

Signed and Sealed this

Third Day of April, 2001

Attest:

NICHOLAS P. GODICI

*Attesting Officer*     Acting Director of the United States Patent and Trademark Office